July 26, 1932.  A. RAMBOLD  1,869,116

MACHINE FOR CLOSING LITTLE BAGS

Filed March 26, 1930    8 Sheets-Sheet 1

Inventor
Adolf Rambold

July 26, 1932.　　A. RAMBOLD　　1,869,116

MACHINE FOR CLOSING LITTLE BAGS

Filed March 26, 1930　　8 Sheets-Sheet 3

July 26, 1932. A. RAMBOLD 1,869,116
MACHINE FOR CLOSING LITTLE BAGS
Filed March 26, 1930 8 Sheets-Sheet 4

July 26, 1932.　　　　A. RAMBOLD　　　　1,869,116
MACHINE FOR CLOSING LITTLE BAGS
Filed March 26, 1930　　8 Sheets-Sheet 6

July 26, 1932.   A. RAMBOLD   1,869,116
MACHINE FOR CLOSING LITTLE BAGS
Filed March 26, 1930   8 Sheets-Sheet 7

Fig. 25

Patented July 26, 1932

1,869,116

UNITED STATES PATENT OFFICE

ADOLF RAMBOLD, OF DRESDEN, GERMANY

MACHINE FOR CLOSING LITTLE BAGS

Application filed March 26, 1930, Serial No. 439,193, and in Germany December 31, 1929.

This invention relates to a machine for forming, filling and closing little bags, specially portion bags for tea and similar material to be lixiviated with boiling water, in which a piece cut from a strip of tulle or other porous fabrics is placed upon the die of a drawing device and there formed into a seamless bag by the pressing in of a hollow ram, the filling material, such as tea or the like fed into the bag through this hollow ram, whereupon after withdrawal of the ram the neck of the bag is formed by pressing together the projecting corners, a piece of metal cut off a metal band so that it has bevelled ends, is then placed around the neck so that the bevelled ends engage with one another, the projecting corners of the neck having been cut off at the same time and sucked off, a holding thread being placed between the neck and the ring, a ticket designed for advertising purposes, as sign or the like being attached to the free end of the thread.

Up to the present it has not been possible, to produce in one operation, fill and close a bag and to tie a holding thread around the neck of the bag, said thread having a ticket at the free end and being wound around the bag, and to discharge this filled bag onto a convenient means for further conveying.

With the aid of the machine according to the invention it is possible, to fill bags for preparing tea or the like with accurately dosed quantities, to close the filled bags, and to treat them further, the bags being never touched by the workman during the entire proceeding. As the several operations had hitherto to be carried out by hand for the greatest part, an extraordinarily great increase of output is obtained by the invention. The manufacturing, filling and closing of the bags is further effected in a manner, which is quite perfect in hygienic respect.

An embodiment of the invention is illustrated by way of example in the accompanying drawings in which:

Fig. 21 is a front elevation and

Fig. 22 a side elevation of the device for winding the holding thread around the bag for preventing the thread carrying the label from hanging down.

Fig. 23 is a section on the line XXIII—XXIII of Fig. 21.

Fig. 24 is a section on line XXIV—XXIV of Fig. 21.

Figures 1, 2:
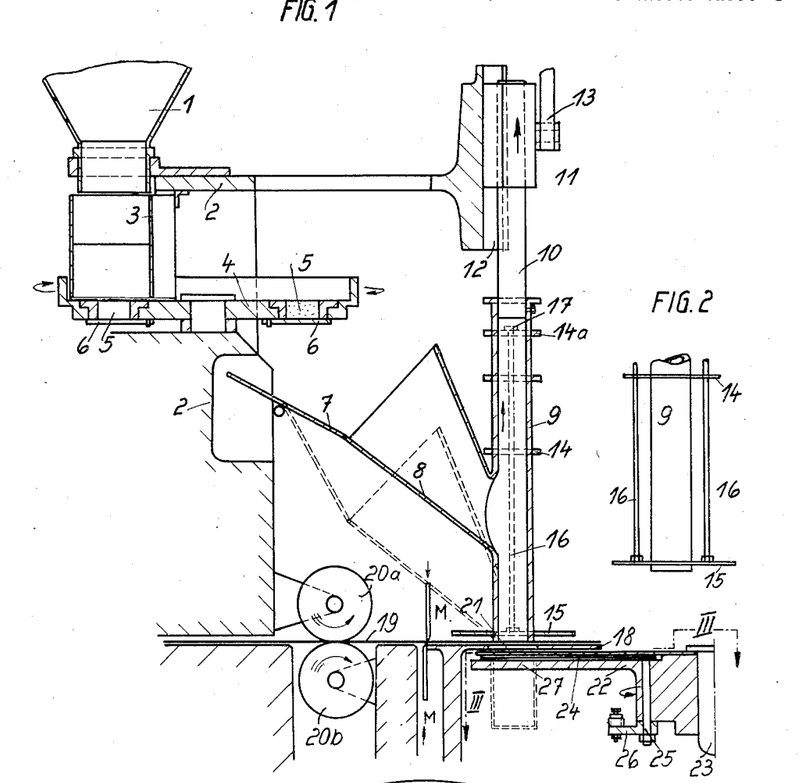
Fig. 1 shows in longitudinal central section the machine for forming and filling the bags.
Fig. 2 shows the hollow ram in side elevation.
Figure 3:
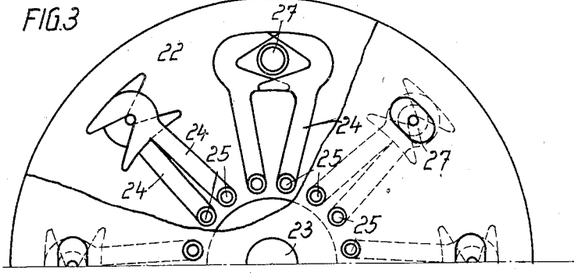
Fig. 3 is a top plan view showing the rotary disc with the grippers for gripping the bag.

The material, for instance tea, to be filled into the bags, is supplied from a hopper 1 fixed on the machine frame 2. Under the hopper 1 a vessel 3 is arranged, from which the material drops into cups 5 of a rotatable disk 4. The open bottom end of the cups 5 is closed by discs 6, controlled by curves or the like not shown. The vessel 3 fixed on the machine frame 2 is so arranged, that the cups 5 are filled by the same up to their top edge. A flap 7, pivotally mounted on a funnel 8, extends under said disc 4, said funnel merging into a hollow ram 9. The hollow ram 9, rigidly connected by a rod 10 to a slidable element 11 adapted to slide in a guide 12 of the machine frame 2 said slidable element being driven through the intermediary of a rod 13 from a crank not shown, has several flanges 14. A ring 15 adapted to be pushed over the hollow ram 9 carries rods 16, guided in holes in the flanges 14 of the hollow ram. On the top end of each rod 16 a disc 17 is arranged which, when the hollow ram 9 is being lifted in the direction of the arrow (Fig. 1), strikes against the flange 14a so that, when the movement of the hollow ram 9 continues, the ring 15 is being lifted. Under the ring 15 a table plate 18 is arranged, onto which the paper band or strip 19 is delivered, which has been unwound from a big roll, and from which the bag has to be made. The band or strip 19 is conveyed onto the table plate by a pair of rolls 20a and 20b.

The table plate 18 has an aperture 21, through which the hollow ram 9 can pass. Under the table plate 18 a disc 22 is arranged, which is adapted to pivot around a bolt 23 and is stepwise rotated by a Maltese cross having eight arms, not shown in the drawings. On this disc 22 eight pairs of grippers 24 are arranged, the ends of which are fixed on rods 25.

Figure 4:
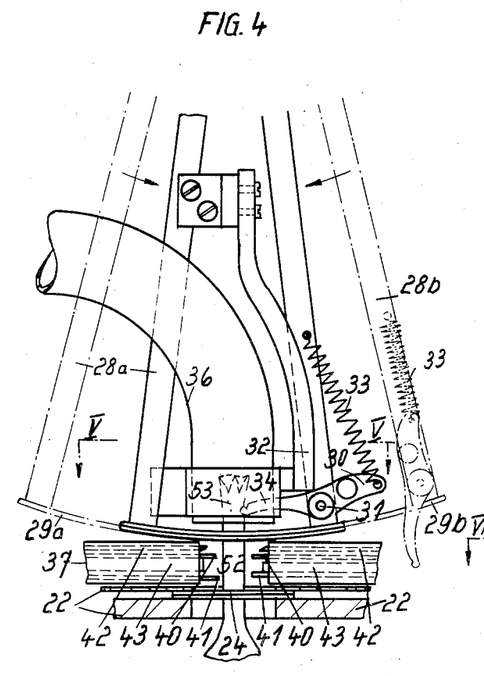
Fig. 4 shows in front elevation the device for placing the holding ring around the neck of the bag, in the inoperative position.
Figure 5:
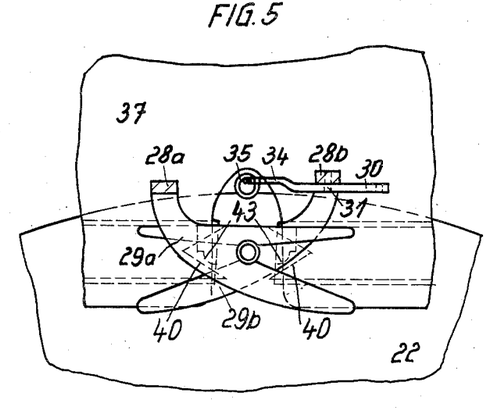
Fig. 5 is a section on line V—V of Fig. 4.
Figure 6:
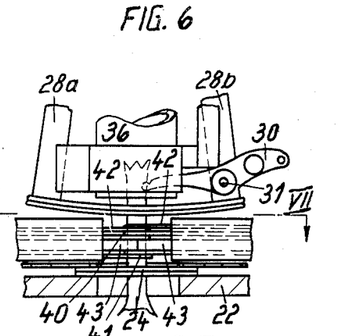
Fig. 6 shows the same device in operative position.
Figure 7:
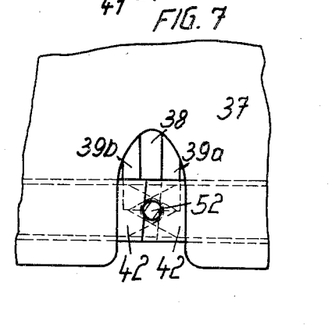
Fig. 7 is a section on line VII—VII of Fig. 6.
Figures 8, 9:
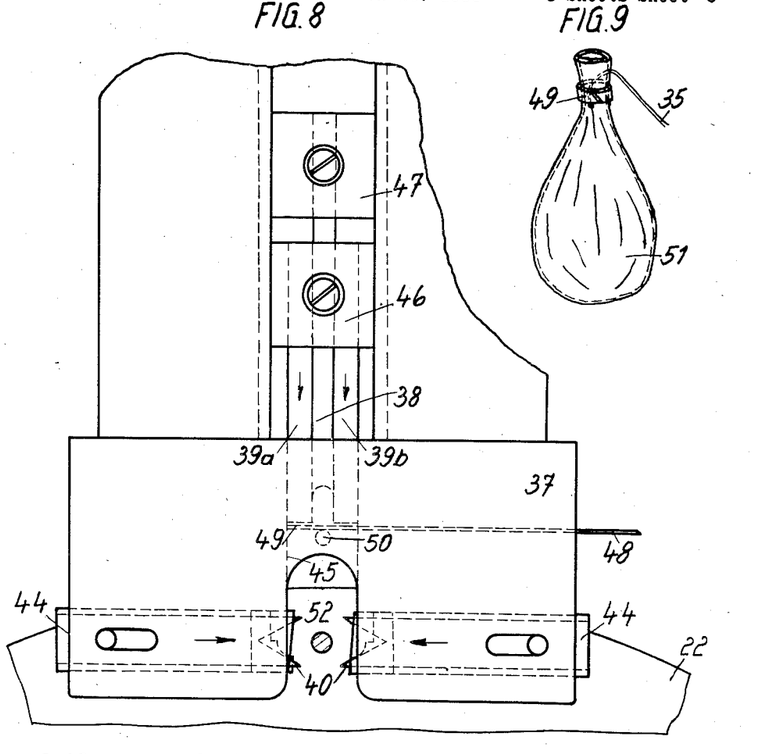
Fig. 8 shows in top plan view the stitching head.
Fig. 9 shows a filled bag with the holding thread and closing ring.
Figure 10:
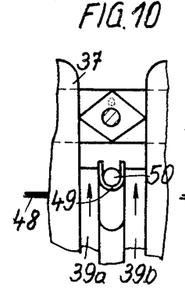
Figs. 10 to 14 illustrate the different positions for bending the locking ring from the wire and for placing the same around the neck of the bag.
Figure 11:
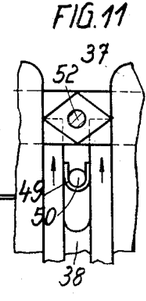
Figure 12:
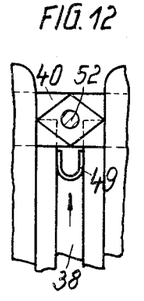
Figure 13:
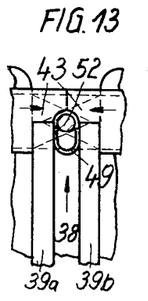
Figure 14:
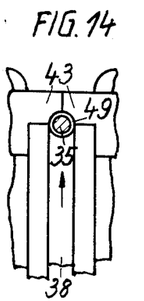
Figure 15:
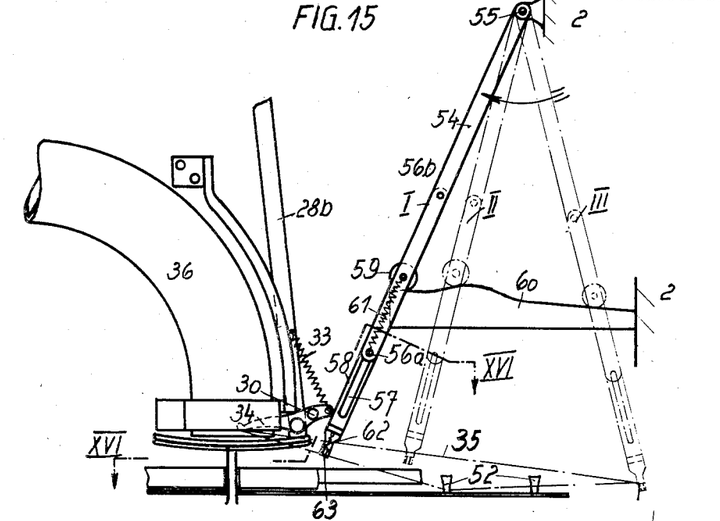
Fig. 15 shows in side elevation the device for placing the ring around the neck of the bag, with a lever to which a thread guide is fixed, which feeds the holding thread to the double tongs.

On each rod 25 an arm 26 is mounted adapted to be turned by means of curves or cams, not shown. In the disc 22 eight cut out portions 27, designed to let pass the hollow ram 9, are arranged. The stitching device is arranged 90° relative to the filling device. On its element, adapted to be shifted in upward and downward direction, two levers 28a and 28b are mounted (Fig. 4). On the free end of these levers 28a and 28b grippers 29a and 29b are mounted. The lever 28b serves further as support for a two armed lever 30, pivotally mounted on a pivot bolt 31. A stop 32, rigidly connected with the slidable element, causes an oscillating movement of this two armed lever 30, when the lever 28b is moving in the direction of the arrow. A pull spring 33, attached to the lever 28b, returns the lever 30 into its initial position, as soon as it is no longer in contact with the stop 32 (position indicated in Fig. 4 in mixed lines). The arm 34 of the two armed lever 30 serves for lifting the holding thread 35 (Fig. 15). A suction tube 36, rigidly connected with the stop 32, serves to suck off the cut off corners 53 of the bag. A plate 37 is arranged between the grippers 29 and the disc 22 (Figs. 4 and 8) adapted to be shifted radially relative to the bolt 23. In this plate 37 rams 38 and 39 are mounted shiftable in the same direction. Gripper pairs 40 and 41, shiftable in the direction of the arrow (Fig. 8), are mounted in the front portion of the plate 37, perpendicular to the direction of movement of the rams 38 and 39. A gripper pair 42 for cutting off the corners of the bag and anvil portions 43 are further mounted in this front portion of plate 37. These elements are all mounted on a guide plate 44, adapted to be driven in any suitable manner i. e. by cranks. The rams 38 and 39 are shifted in a channel 45 (Fig. 8). The rams 39a and 39b are held together by a slidable element 46, which is driven in any suitable manner, for instance by curves or the like. This slidable element 46 has a cut out portion, in which the ram 38 slides, which is driven by means of a guide element 47. After the wire 48, from which the holding ring has to be bent, has entered the channel 45, the rams 39 move, in a manner known per se, in the direction of the arrow (Figs. 8, 10 and 11) and cut the piece 49 off the wire 48, said piece being bent around a mandrel 50 at the further forward movement of the rams 39. The rams 39 advance then up to the middle of the bag 51 (Fig. 11). The mandrel 50 is then withdrawn, and the ram 38 pushes the U-shaped piece of wire 49 in the direction of the arrow (Fig. 12). The guide elements 44 (Fig. 8) begin now to move in the direction of the arrow, so that the free ends of the anvil elements 43 come into contact and bear in a semicircle around the neck 52 of the bag 51 and against the rams 39. At the same time the pairs of gatherers 40 and 41 have closed around the neck 42 of the bag (Figs. 6 and 13) and the corners of this neck have been cut off by the knife pairs 42 and sucked off through the suction tube 36.

Figure 20:
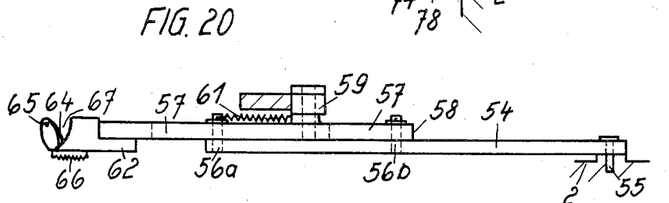
Fig. 20 shows in side elevation the thread guide lever.
Figures 21, 22, 23, 24:
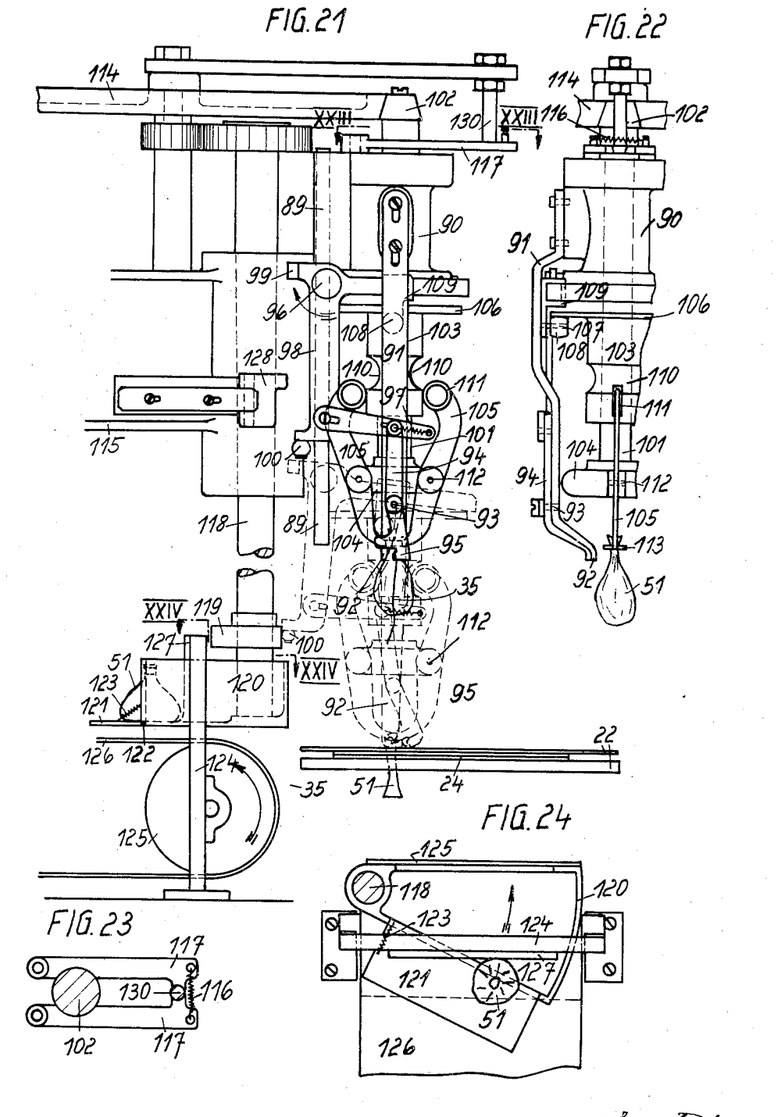
Figure 25:
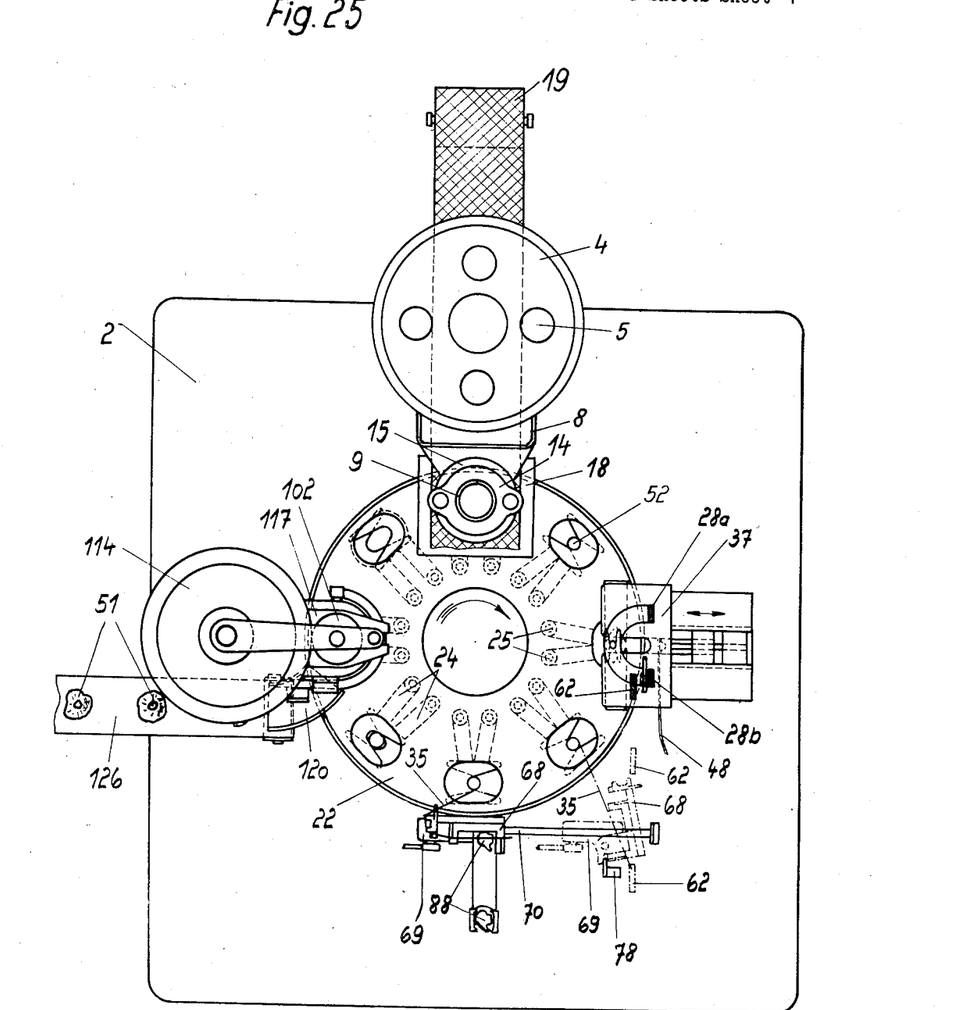
Fig. 25 is a top plan view of the whole machine.
Figure 26:
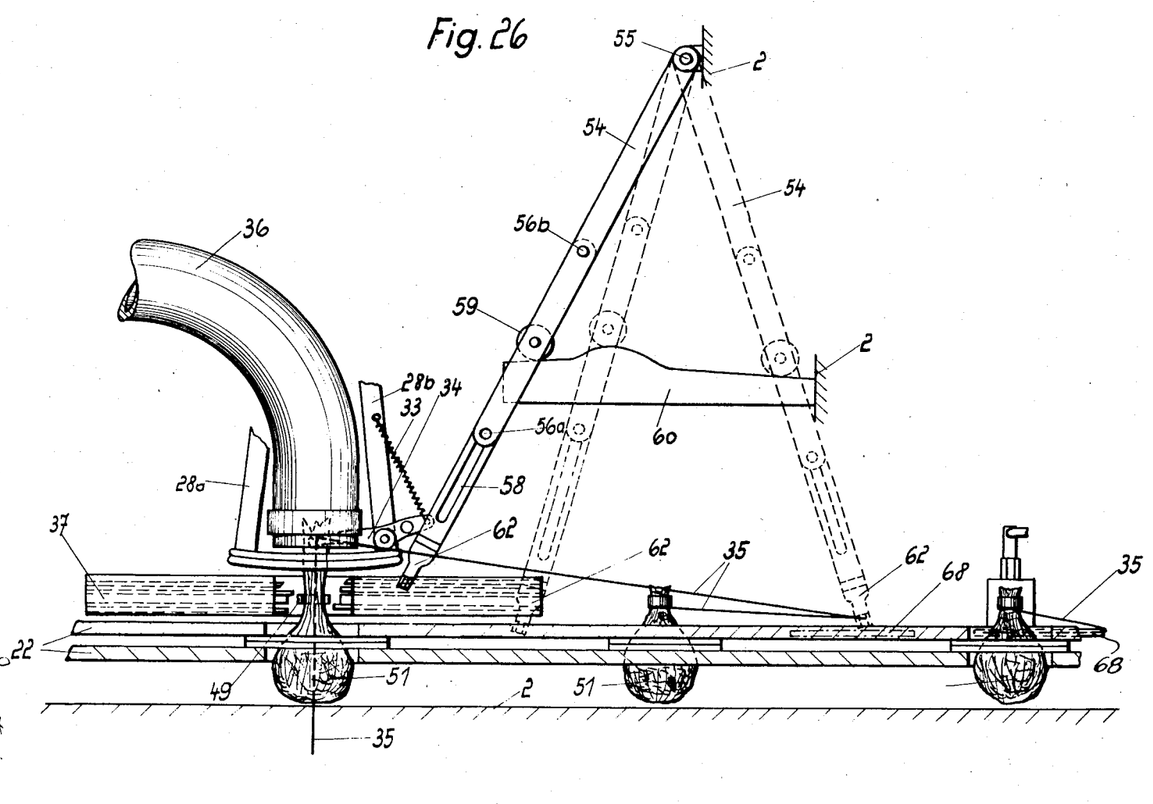
Fig. 26 shows in section the stitching device with the bag carrier and bags.

When the ram 38 continues to move in the direction of the arrow (Fig. 13), the ends of the U-shaped wire 49 engage into the ring-shaped gap between the anvil parts 43 and the neck 52 of the bag until the ends of the wire 49 meet and form a closed ring. The holding thread 35 is securely held together with the neck 52 of the bag by the ring 49 (Fig. 9). At the side of the stitching device (Fig. 15) a lever 54 is arranged, pivotally mounted on a bolt 55 fixed on the machine frame 2. On this lever 54 two bolts 56a and 56b are fixed, which engage with slots 57 in a slidable element 58. A roller 59 on this slidable element 58 rolls on a curved guide bar 60 fixed on the machine frame 2. The slidable element 58 is connected to the bolt 56a by a pull spring 61, pressing the roller 59 against the curved bar 60. A thread guide 62 is fixed on the free end of the slidable element 58. In a cut off portion 63 on the free end of the thread guide 62, a lever 64, oscillatable around an axle 65, (Fig. 20) is movably arranged. The free end of the lever 64 is connected to the thread guide 62 by a pull spring 66, so that the holding thread 35 is jammed in the mouth 67 of the thread guide 62. A double mouth thread fork (Figs. 16 to 19) is fixed on a slidable element 69, adapted to slide to and fro on rods 70, and driven for instance by a connecting rod 71 from a crank not shown. On a projection 72 of the slidable element 69 an axle 73 is fixed, on which a two-armed lever 74 is pivotally mounted. On the slidable element 69 a holder 75 is further fixed, which is connected by a spring 76 with said two-armed lever 74. This two-armed lever 74 carrier a roller 77 adapted to strike against a stop 78, fixed on the machine frame 2. One end of the two-armed lever 74 is bent upwards at right angles and carries in this bent up end 81 two thread forks 79 and 80 acting in opposite directions. The end 81 has two beam-like projections 82 and 83. On the projection 82 presses the thread fork 79 rotatable around an axle 84, and on the projection 83 rests the thread fork 80 oscillatable around the axle 85. A feeder 86 on the front end of the thread fork 68 is adapted to be moved in vertical directions and to feed the holding thread 35 to a hook 87. When the thread fork 68 is standing at right angles to the stitching device (Fig. 16 position V) and consequently opposite the filling device and the hollow ram 9, the thread 35 is stitched by a stitching device arranged vertically above the thread fork, in the ticket 88 conveyed from the side. Opposite the plate 37 the device for winding the holding thread 35 around the bag is arranged, as shown in Figs. 21 to 23. On a bracket 115 fixed on the machine frame 2 a sliding face 89 is arranged, on which an element 90 can slide, which is adapted to move up and down in vertical direction and is driven by curves, crank or similar devices. On the slidable element 90 a rod 91 is fixed, which is bent several times and ends in a finger 92. A two-armed lever 94 is oscillatably mounted on a bolt 93 fixed on the rod 91, the end 95 of this lever bearing against the finger 92 so that only the holding thread 35 can pass through. The other end of the two-armed lever 94 sits loosely to a lever, which is pivotally mounted on a rod 98 oscillatable around an axle 96, and is tensioned by a spring 97. On this rod 98 an abutment piece 99 and a roller 100 are fixed, which control the oscillation alternately in the one and in the other direction. A spindle 101 extends through the slidable element 90 and carries on its top end a conical friction wheel 102. On this spindle 101 a sleeve 103 is slidably mounted, which carries at the lower end a ring 104, to which two opposite two-armed levers 105 are oscillatably fixed. The sleeve 103 carries on its top end a collar 106, under which engages a roller 108, rotatable around a bolt 107, a stop 109 being arranged above said collar. The stop 109 and the roller 108 are rigidly connected to the rod 98. The sleeve 103 has an annular groove 110 in the outer surface, with which rollers 111 can engage, which are arranged on the two-armed levers 105. On the other end of the two-armed levers 105, oscillatable around the axle 112, beaks 113 are mounted, designed to grip and hold the bag 51. As soon as the slidable element 90 has arrived in its extreme upper position, the friction wheel 102, the spindle 101, the sleeve 103 and the grippers 105 are rotated by a large rotating disc 114. A brake placed around the wheel 102 (Fig. 23) brakes the spindle 101 with the grippers 105 as soon as the slidable element 90 begins again to descend. In the extreme upper position a pin 130 presses the spring-controlled brake arms 117 away from one another, whereby the wheel 102 is liberated. In the bracket 115 a spindle 118 is further journaled, which is driven from the disc 114 by a counter shaft. The spindle 118 carries on the lower end a cam disc 119 adapted to act upon the roller 100, when the rods 98 are in the lowest position. The rods 98 are thereby oscillated back into the vertical position, the finger 95 over the bolt mounted on the rods 98 is pressed against the finger 92, and the roller 111 is at the same time disengaged from the groove 110 of the sleeve 103, so that the beaks 113 of the gripper levers 105 are closed. On the bracket 115 a hinge-like abutment 128 is further arranged, against which the abutment 99 strikes, when the element 90 is descending, whereby the oscillating of the rods 98 out of the vertical position is caused. On the lowermost end of the spindle 118 a vessel 120 is fixed, the end wall 121 of which is oscillatable around an axle 122 and pulled into the vertical position by the action of a spring 123. On the machine frame an upright 124 is fixed, on which rollers 125 are mounted, which guide a conveyer band 126. On the upper portion of the upright 124 an abutment 127 is fixed, against which the bag 51 situated in the vessel 120 strikes when this vessel is moving along the upright in the direction of the arrow (Fig. 24).

The operation of the machine is as follows:

The material to be filled into the bags, for instance tea, is fed from the hopper 1 into the cups 5 in accurately uniform quantities. As soon as a cup 5 is standing above the flap 7, the covering plate 6 is pushed aside so that the contents of the cup drop onto the flap 7. The paper band or strip 19 has in the meantime been fed by the rollers 20 upon the table plate 18 and a square piece is cut off by the knife M. The hollow ram 9 is still in its higher position (Fig. 1), and the ring 15 has not yet come to rest upon the cut off piece of paper. The grippers 24, lying under the ram 9, are open. The ram 9 begins to descend. The ring 15 comes first to rest upon the piece of paper lying on the table plate 18, whereas the hollow ram 9 continues to descend into the position shown in Fig. 1 in dash lines. By the downward movement of the hollow ram 9 the flap 7 has assumed the downwardly inclined position shown in dash lines in Fig. 1 so that the tea slips from the flap 7 through the funnel 8 and hollow ram 9 onto the piece of paper from which the bag has to be formed. The hollow ram 9 then ascends and, as soon as its lower edge has risen above the grippers 24, these grippers close. The disc 32 rotates then 90° together with the bag clamped in the grippers 24 and arrives in front of the stitching device.

The grippers 29a and 29b (Fig. 4) grip then the corners of the piece of paper and the bag is formed by the oscillation of the lever 28b in the direction of the arrow (Fig. 4). During this oscillating movement the lever 30 has oscillated into the position shown in Fig. 4 in full lines, and its arm 34 has gripped the holding thread 35 supplied from below from a spool, the other end of the thread being attached to the bag which has been previously stitched (Fig. 15). The thread is pulled up so that it can be gripped by the thread guide 62 arranged at the side of the stitching device and adapted to oscillate. The stitching head 37 (Figs. 4 and 8) advances then with the tools arranged on it radially with regard to the disc 22, until this disc has arrived in the position shown in Fig. 8. By the guiding elements 44 moving in the direction of the arrow (Fig. 8), the neck 56 of the bag is gripped and held, besides by the grippers 24 and 29, by gripper pairs 40 and 41 (Figs. 4 and 6), and the corners 53 of the neck are cut off by the knives 46 and sucked away, the anvil elements 43 having placed themselves against the neck 52 of the bag (Fig. 13), so that in the manner described above the holding ring 49 can be placed around the neck 52. The holding thread 35, which is fed from below directly at the side of the neck 52 of the bag, is lifted by the lever 30 and gripped by the thread fork 62 before it is clamped by the holding ring 49. The lever 54, which at the gripping of the thread is in the position I (Fig. 15), is oscillated into the position II and thereby pulls the thread 35 to the required length. The lever 54 oscillates then back into the position I, whereby the thread 35 becomes slack. At this instant the stitching and severing of the thread 35 takes place. The plate 37 is then pushed back by the rotatable disc 22, and the thread guide 62 grips the cut off end of the thread 35 and oscillates it into the position III (Fig. 15).

Figure 16:
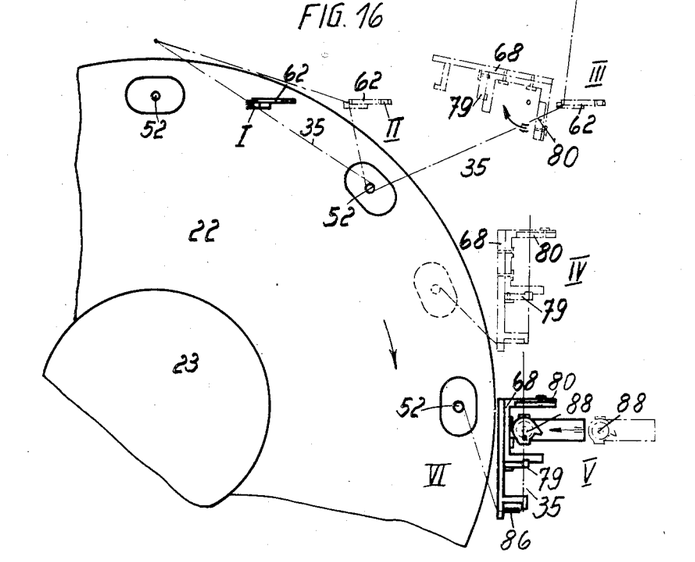
Fig. 16 is a section on line XVI—XVI of Fig. 15.

Whilst the lever 54 is moving with the thread guide 62 into the position III, the double mouth thread fork 68 moves from the position shown in Fig. 16 in full lines into the range of the thread 35 which, at the oscillation of the thread fork 68 through approximately 100°, moves in the direction of the arrow into the clamp 80 and is held by the same, (position III Fig. 16). The thread fork 68 oscillates then back in the opposite direction of the arrow (Fig. 16) through approximately 100°, whereby the holding thread 35 is pushed into the second mouth 79 of the thread fork 68 and placed around the front portion of the thread fork. The thread fork 68 continues to move into the positions IV and V, the disc 22 rotating at the same time in the direction of the arrow into the position VI.

Figures 17, 18:
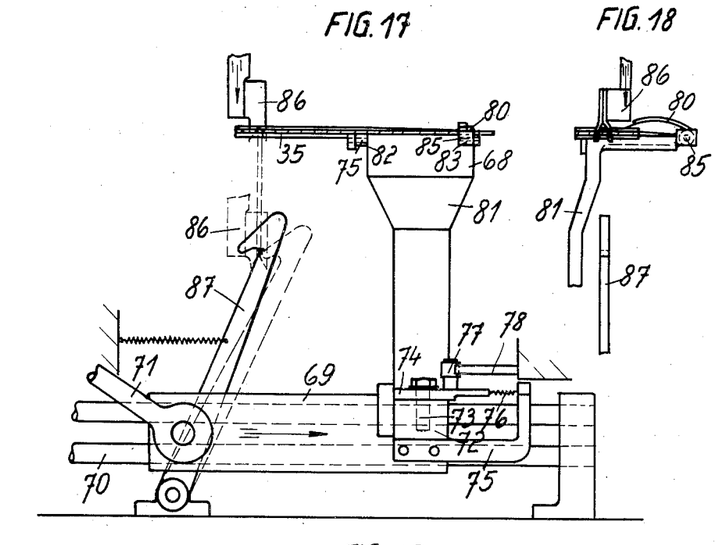
Fig. 17 shows in side-elevation the double mouth thread tongs and the driving means.
Fig. 18 is a side elevation of these tongs and Fig. 19 is a top plan view of the same.
Figure 19:
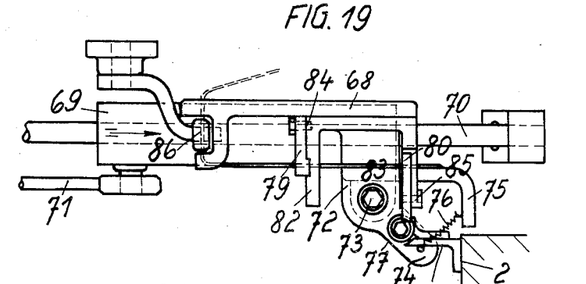

In this position of disc 22 a ticket 88 is brought under a stitching device (not shown), which is arranged vertically above the ticket 88 shown in Fig. 16 in full lines. The feeder 86 (Fig. 17) grips the portion of the holding thread 35 placed around the front part of the thread fork 68 and, when shifting in downward direction, places this thread into a hook 87 controlled by a spring. After the thread 35 has been stitched on the ticket 88 (position V Fig. 16), the thread end with the ticket 88 is pulled away from the ticket feeder by the hook 87 so that it hangs down on the circumference of the disc 22 (Fig. 17).

The disc 22 continues to rotate 90° from the position VI in the direction of the arrow (Fig. 16), so that the neck 52 of the bag comes to lie under the device for winding the holding thread 35 (Fig. 21). The slidable element 90 descends with the sleeve 103 and the gripper levers 105, until the open beaks 113 have arrived almost on the disc 22 (position shown Fig. 21 in dash lines). By the cam disc 119 fixed on the spindle 118 striking against the roller 100, the rods 98 are pushed into the vertical position. The oscillating movement of the rods 98 around the fulcrum 96 has the result, that the lower end 95 of the two-armed lever 94 strikes against the finger 92 and grips the holding thread 35. The sleeve 103 has further been shifted a short distance upwards by the roller 108 on the spindle 101, whereby the rollers 111 have removed out of the groove 110 of sleeve 103. The two-armed levers 105 have thereby oscillated towards one another around the axle 112, and the beaks 113 on the lower ends of the levers 105 grip around the neck of the bag. The grippers 24 mounted in the rotary disc 22 open, and the slidable element 90 with the sleeve 103, the levers 105 and the bag 51 are shifted in upward direction on the spindle 101, until the conical friction wheel 102 on this spindle engages with the rotating disc 114, whereby the sleeve 103 with the levers 105 and the bag 51 are rotated around the axis of the spindle 101, and the holding thread 35 is wound around the bag. The slidable element 90 then descends, the brake arms 117 are approached the one to the other by the spring 116, bear against the wheel 102 and brake the rotating movement of the bag 51. The slidable element 90 continuing to descend, the projection 99 strikes against the stop 128 arranged on the bracket 115, so that the rods 98 are oscillated in the direction of the arrow (Fig. 21), the gripper beaks 113 opened and also the lever element 95. The bag 51 can then drop freely together with the holding thread 35 and is caught by the box 120 fixed on the spindle 118, which is rotated in the direction of the arrow line (Fig. 24) until the bag 51 strikes on its travel against the abutment 127, fixed on the upright 124. When the box 120 continues to rotate in the direction of the arrow, its side wall 121 is lowered into the horizontal position, and the bag 51 shifted on this lowered side wall until it drops onto the conveyer band 126 and is conveyed by the same into containers for further packing.

I claim:

1. A machine for forming, filling and closing little bags containing portions of tea, coffee or other material to be lixiviated in boiling water, comprising in combination with a machine frame, a table plate, means for conveying a strip of suitable porous fabric, a cutting device for cutting a square piece off said strip and for conveying the same onto said table plate, a hollow ram adapted to convey a portion of tea onto said piece of fabric, devices for forming the piece of fabric into a bag at the return stroke of said hollow ram, means for conveying a metal band, means for cutting a short piece with inclined edges off said metal band, means for cutting off the projecting corners of the neck of the bag, means for sucking off the cut off corners, means for bending said piece of metal band in ring-shape around the neck of said bag, means for feeding a holding thread to the neck of the bag under said metal ring, and means for feeding a ticket.

2. A machine as specified in claim 1, comprising in combination with the hollow ram for supplying the material for filling the bag onto a piece of porous fabric, a table plate having an aperture for the passage of said hollow ram, a movable ring on said table adapted to hold said piece of fabric, a permanently rotating disc under said table plate, and tongs-like grippers on said table plate for gathering together the corners of said piece of fabric to form a bag.

3. A machine as specified in claim 1, comprising in combination with a rotatable disc carrying gathering tools, levers oscillatably mounted above said disc, grippers at the ends of said levers, a spring-controlled thread holder for the thread from the preceding bag at the end of one of said grippers, a stationary abutment against which said thread holder with thread is pushed at the oscillation of said levers, a plate inserted between said rotatable disc and said levers, and tools on said plate adapted to place the holding wire around the neck of the bag and to cut off the corners of said bag.

4. A machine as specified in claim 1, comprising in combination two mutually displaceable slidable elements, a knife in each of said elements, a part of an anvil in each of said slidable elements, and two gripper pairs, all these elements fixed the one above the other.

5. A machine as specified in claim 1, comprising in combination two mutually displaceable slidable elements, a knife in each of said elements, a part of an anvil in each of said slidable elements, adapted to enclose the bag neck to bend the holding wire and to join the ends of the same, and two gripper pairs, all these elements fixed the one above the other.

6. A machine as specified in claim 1, comprising an oscillatable lever, a thread guide shiftably mounted on the free end of said oscillatable lever, a curved guide for controlling said thread guide, double mouthed thread tongs to which the thread is fed by said thread guide, a slidable element on which said thread tongs are pivotally fixed, and a stop adapted to oscillate said thread tongs.

7. A machine as specified in claim 1, comprising in combination, double mouthed thread tongs, a spring-controlled hook oscillatably arranged under said thread tongs, and a thread feeder for depositing the stitching thread into said hook.

8. A machine as specified in claim 1, comprising a vertical spindle, means for shifting said spindle upwards and downwards and for periodically rotating the same, an axle transverse to the axis of said spindle, two gripper levers oscillatably mounted on said transverse axle, a lever for holding the stitching thread, a rod system for operating said gripper levers, and two abutments adapted to control the one said rod system and the other said thread lever.

In testimony whereof I affix my signature.

ADOLF RAMBOLD.